United States Patent
Nguyen et al.

(10) Patent No.: US 10,437,830 B2
(45) Date of Patent: Oct. 8, 2019

(54) METHOD AND APPARATUS FOR IDENTIFYING MEDIA FILES BASED UPON CONTEXTUAL RELATIONSHIPS

(71) Applicant: Nokia Technologies Oy, Espoo (FI)

(72) Inventors: David Nguyen, Santa Clara, CA (US); Praveen Krishnan, Sunnyvale, CA (US); Vijo Cherian, San Jose, CA (US); Tsaifa Yao, Santa Clara, CA (US)

(73) Assignee: Nokia Technologies Oy, Espoo (FI)

( * ) Notice: Subject to any disclaimer, the term of this patent is extended or adjusted under 35 U.S.C. 154(b) by 655 days.

(21) Appl. No.: 15/027,543

(22) PCT Filed: Oct. 14, 2013

(86) PCT No.: PCT/US2013/064846
§ 371 (c)(1),
(2) Date: Apr. 6, 2016

(87) PCT Pub. No.: WO2015/057185
PCT Pub. Date: Apr. 23, 2015

(65) Prior Publication Data
US 2016/0246848 A1     Aug. 25, 2016

(51) Int. Cl.
*G06F 16/2457* (2019.01)
*G06F 16/438* (2019.01)
*H04W 4/02* (2018.01)

(52) U.S. Cl.
CPC ...... *G06F 16/24575* (2019.01); *G06F 16/438* (2019.01); *G06F 16/4393* (2019.01); *H04W 4/023* (2013.01)

(58) Field of Classification Search
None
See application file for complete search history.

(56) References Cited

U.S. PATENT DOCUMENTS

| | | | |
|---|---|---|---|
| 6,985,588 B1 * | 1/2006 | Glick | G06F 21/10 380/258 |
| 8,060,477 B1 * | 11/2011 | Svendsen | G06F 17/3002 707/653 |
| 2004/0267596 A1 * | 12/2004 | Lind | G06Q 30/0201 705/7.29 |
| 2005/0188399 A1 | 8/2005 | Tischer | |
| 2007/0100701 A1 * | 5/2007 | Boccon-Gibod | G06F 21/10 705/21 |

(Continued)

FOREIGN PATENT DOCUMENTS

CN     102938939 A     2/2013
CN     103189853 A     7/2013

(Continued)

OTHER PUBLICATIONS

Office action received for corresponding Japanese Patent Application No. 2016-522803, dated Jun. 13, 2017, 3 pages of office action and 4 pages of translation available.

(Continued)

*Primary Examiner* — Jason G Liao
(74) *Attorney, Agent, or Firm* — Mintz Levin Cohn Ferris Glovsky and Popeo, P.C.

(57) ABSTRACT

A method, apparatus and computer program product are provided to facilitate the identification of one or more media files stored on respective ones of a plurality of user devices. In the context of a method, a current context is determined. The method also automatically identifies one or more media files stored on respective ones of a plurality of user devices based upon a relationship between a context associated with the respective media file and the current context. The method also causes the one or more media files to be transferred to an output device for presentation. A corresponding apparatus and computer program product are also provided.

18 Claims, 4 Drawing Sheets

(56) References Cited

U.S. PATENT DOCUMENTS

| | | |
|---|---|---|
| 2009/0089288 A1 | 4/2009 | Petersen |
| 2010/0245361 A1 | 9/2010 | Ofek et al. |
| 2011/0141974 A1 | 6/2011 | Lieberman |
| 2011/0211737 A1 | 9/2011 | Krupka et al. |
| 2011/0239158 A1 | 9/2011 | Barraclough et al. |
| 2012/0124517 A1 | 5/2012 | Landry et al. |
| 2012/0129576 A1 | 5/2012 | Lee et al. |
| 2012/0158864 A1 | 6/2012 | Schindler et al. |
| 2012/0188382 A1 | 7/2012 | Morrison et al. |
| 2012/0209910 A1 | 8/2012 | Svendsen et al. |
| 2012/0215771 A1 | 8/2012 | Steiner |
| 2013/0065526 A1 | 3/2013 | Pottier et al. |
| 2013/0331147 A1 | 12/2013 | Chang et al. |

FOREIGN PATENT DOCUMENTS

| | | |
|---|---|---|
| CN | 103299305 A | 9/2013 |
| EP | 1764714 A1 | 3/2007 |
| JP | 2002-334102 A | 11/2002 |
| JP | 2003-233752 A | 8/2003 |
| JP | 2003-273937 A | 9/2003 |
| JP | 2008-083100 A | 4/2008 |
| JP | 2009-134675 A | 6/2009 |
| JP | 2010-068247 A | 3/2010 |
| JP | 2011-217128 A | 10/2011 |
| JP | 2012-018412 A | 1/2012 |
| JP | 2012-074073 A | 4/2012 |
| JP | 2012-133530 A | 7/2012 |
| JP | 2012133530 A | 7/2012 |
| JP | 2013165361 A | 8/2013 |
| JP | 2014006669 A | 1/2014 |
| WO | 2007/105436 A1 | 9/2007 |
| WO | 2013/079769 A1 | 6/2013 |

OTHER PUBLICATIONS

Final Office action received for corresponding Japanese Patent Application No. 2016-522803, dated Nov. 7, 2017, 3 pages of office action and 4 pages of translation available.

Office action received for corresponding European Patent Application No. 13895568.7, dated Nov. 29, 2017, 10 pages.

Huuskonen et al., "Collaborative Context Recognition for Mobile Devices", Handbook of Ambient Intelligence and Smart Environments, Oct. 21, 2009, pp. 257-280.

Office action received for corresponding Chinese Patent Application No. 201380081161.1, dated Jan. 24, 2018, 10 pages of office action and 3 pages of translation available.

Final Office action received for corresponding Japanese Patent Application No. 2016-522803, dated Feb. 20, 2018, 4 pages of office action and 5 pages of translation available.

International Search Report and Written Opinion received for corresponding Patent Cooperation Treaty Application No. PCT/US2013/064846, dated Mar. 17, 2014, 8 pages.

Favela et al., "Integrating Context-Aware Public Displays into a mobile hospital information system", IEEE Transactions on Information Technology in Biomedicine, vol. 8, No. 3, Sep. 2004, pp. 279-286.

Beaudoin et al., "A Framework for Contextual Metadata Used in the Digital Preservation of Cultural Objects", D-Lib Magazine, vol. 18, Nov. 1, 2012, pp. 1-27.

Extended European Search Report received for corresponding European Patent Application No. 13895568.7, dated Mar. 17, 2017, 11 pages.

O'Hare et al., "MediAssist: Using Content-Based Analysis AndContext to Manage Personal Photo Collections", International Conference on Image and Video Retrieval, 2006, pp. 529-532.

Beach et al., "WhozThat? Evolving an Ecosystem for Context-Aware Mobile Social Networks", IEEE Network, vol. 22, No. 4, Jul.-Aug. 2008, pp. 50-55.

Xing et al., "Proximiter: Enabling Mobile Proximity-Based Content Sharing on Portable Devices", IEEE International Conference on Pervasive Computing and Communications, Mar. 9-13, 2009, 3 pages.

Gartrell et al., "SocialAware: Context-Aware MultimediaPresentation Via Mobile Social Networks", Thesis, 2000, 42 pages.

Eagle et al., "Social Serendipity: Mobilizing Social software", IEEE Pervasive Computing, vol. 4, No. 2, Jan.-Mar. 2005, pp. 28-34.

* cited by examiner

METHOD AND APPARATUS FOR IDENTIFYING MEDIA FILES BASED UPON CONTEXTUAL RELATIONSHIPS

RELATED APPLICATION

This application was originally filed as Patent Cooperation Treaty Application No. PCT/US2013/064846 filed Oct. 14, 2013

TECHNOLOGICAL FILED

An example embodiment of the present invention relates generally to the identification of one or more media files stored by respective ones of a plurality of user devices and, more particularly, to automatically identifying one or more media files stored by respective ones of a plurality of user devices based upon a relationship between a context associated with the respective media file and the current context.

BACKGROUND

Users commonly store a number of media files upon their various user devices, such as mobile phones, tablet computers, digital cameras or the like. For example, users may store songs, videos, photographs or the like upon their respective user devices. Because of the number of media files stored by a user device and, in some instances, further because of a lack of organization of those media files, the user may have difficulty in identifying one or more of the media files that they would otherwise desire to access, such as to play a song or display a video or other image. Even if the user is able to eventually identify the desired media file, the search of the media files may be inefficient with the user required to expend more time than is desired reviewing the media files.

By way of example, a group of friends may gather. In the past, the same group of friends or a subset of the group of friends may have traveled together, such as to the mountains, the beach or other vacation destination. During the prior trip, the users may have taken a number of photographs that are stored on their various user devices. During the current gathering of the friends, the friends may wish to identify the photographs that were taken during their prior vacation for nostalgic or other reasons. However, the users may have difficulty identifying the photographs stored by their respective user devices or, even if the users are able to identify the photographs, the time required to identify the photographs may be more than is desired.

BRIEF SUMMARY

A method, apparatus and computer program product are provided in accordance with an example embodiment in order to facilitate the identification of one or more media files stored on respective ones of a plurality of user devices. As such, media files can be identified in a more efficient manner so as to facilitate the access and presentation of the media files. The relevancy of the one or more media files that are identified in accordance with an example embodiment of the method, apparatus and computer program product may also be facilitated by identifying media files based upon a relationship between a context associated with the respective media file and the current context.

In an example embodiment, a method is provided that includes determining a current context and automatically identifying one or more media files stored on respective ones of a plurality of user devices based upon a relationship between a context associated with the respective media file and the current context. The method of this embodiment also causes the one or more media files to be transferred to an output device for presentation. For example, the one or more media files may be caused to be transferred to the output device from a plurality of user devices.

The method of an example embodiment may also include causing a user of a respective user device to be queried regarding the transfer of a media file from the respective user device prior to causing the media file to be transferred to the output device. The method of an example embodiment may also include automatically identifying the plurality of user devices in proximity to the output device prior to automatically identifying the one or more media files. In an example embodiment, the method may determine the current context by determining a plurality of users of the plurality of user devices. In this embodiment, the method may also automatically identify one or more media files by determining one or more media files having a context that indicates an association with the plurality of users. The method of an example embodiment may automatically identify one or more media files by reviewing metadata associated with the one or more media files with the metadata being indicative of the context associated with the respective media files.

In another example embodiment, an apparatus is provided that includes at least one processor and at least one memory including computer program code with the at least one memory and the computer program code configured to, with the processor, cause the apparatus to determine the current context and to automatically identify one or more media files stored on respective ones of a plurality of user devices based upon the relationship between a context associated with the respective media file and the current context. The at least one memory and the computer program code are also configured to, with the processor, cause the apparatus of this embodiment to cause the one or more media files to be transferred to an output device for presentation. For example, the at least one memory and the computer program code may be configured to, with the processor, cause the apparatus to cause the one or more media files to be transferred by causing a plurality of media files to be transferred to the output device from a plurality of user devices.

The at least one memory and the computer program code may be further configured to, with the processor, cause the apparatus of an example embodiment to cause a user of a respective user device to be queried regarding transfer of a media file from the respective user device prior to causing the media file to be transferred to the output device. The at least one memory and the computer program code may be further configured to, with the processor, cause the apparatus of an example embodiment to automatically identify the plurality of user devices in proximity to the output device prior to automatically identifying one or more media files. In an example embodiment, the at least one memory and computer program code may be configured to, with the processor, cause the apparatus to determine the current context by determining a plurality of users of the plurality of user devices. In this embodiment, the at least one memory and the computer program code may be configured to, with the processor, cause the apparatus to automatically identify one or more media files by determining one or more media files having a context that indicates an association with the plurality of users. The at least one memory and the computer program code may be configured to, with the processor, cause the apparatus of an example embodiment to automatically identify one or more media files by reviewing metadata associated with the one or more media files with the metadata being indicative of the context associated with the respective media files.

In one embodiment, the apparatus may be embodied by the output device. In another embodiment, the apparatus may be embodied by a device, such as a network device, other than the output device and the plurality of user devices.

In a further example embodiment, a computer program product is provided that includes at least one non-transitory computer-readable storage medium having computer-executable program code portions stored therein with the computer-executable program code portions including program code instructions for determining a current context and for automatically identifying one or more media files stored on respective ones of a plurality of user devices based upon a relationship between a context associated with the respective media file and the current context. The computer-executable program code portions also include program code instructions for causing the one or more media files to be transferred to an output device for presentation. For example, the program code instructions for causing the one or more media files to be transferred may include program code instructions for causing a plurality of media files to be transferred to the output device from a plurality of user devices.

The computer-executable program code portions of an example embodiment may also include program code instructions for causing a user of a respective user device to be queried regarding transfer of a media file from the respective user device prior to causing the media file to be transferred to the output device. The computer-executable program code portions of an example embodiment may also include program code instructions for automatically identifying the plurality of user devices in proximity to the output device prior to automatically identifying one or more media files. In an example embodiment, the program code instructions for determining the current context may include program code instructions for determining a plurality of users of the plurality of user devices. In this embodiment, the program code instructions for automatically identifying one or more media files may include program code instructions for determining one or more media files having a context that indicates an association with the plurality of users. In an example embodiment, the program code instructions for automatically identifying one or more media files may include program code instructions for reviewing metadata associated with the one or more media files with the metadata being indicative of the context associated with the respective media file.

In yet another example embodiment, an apparatus is provided that includes means for determining a current context. The apparatus also includes means for automatically identifying one or more media files stored on respective ones of a plurality of user devices based upon a relationship between a context associated with the respective media file and the current context. The apparatus also includes means for causing the one or more media files to be transferred to an output device for presentation.

BRIEF DESCRIPTION OF THE SEVERAL VIEWS OF THE DRAWINGS

Figure 1:
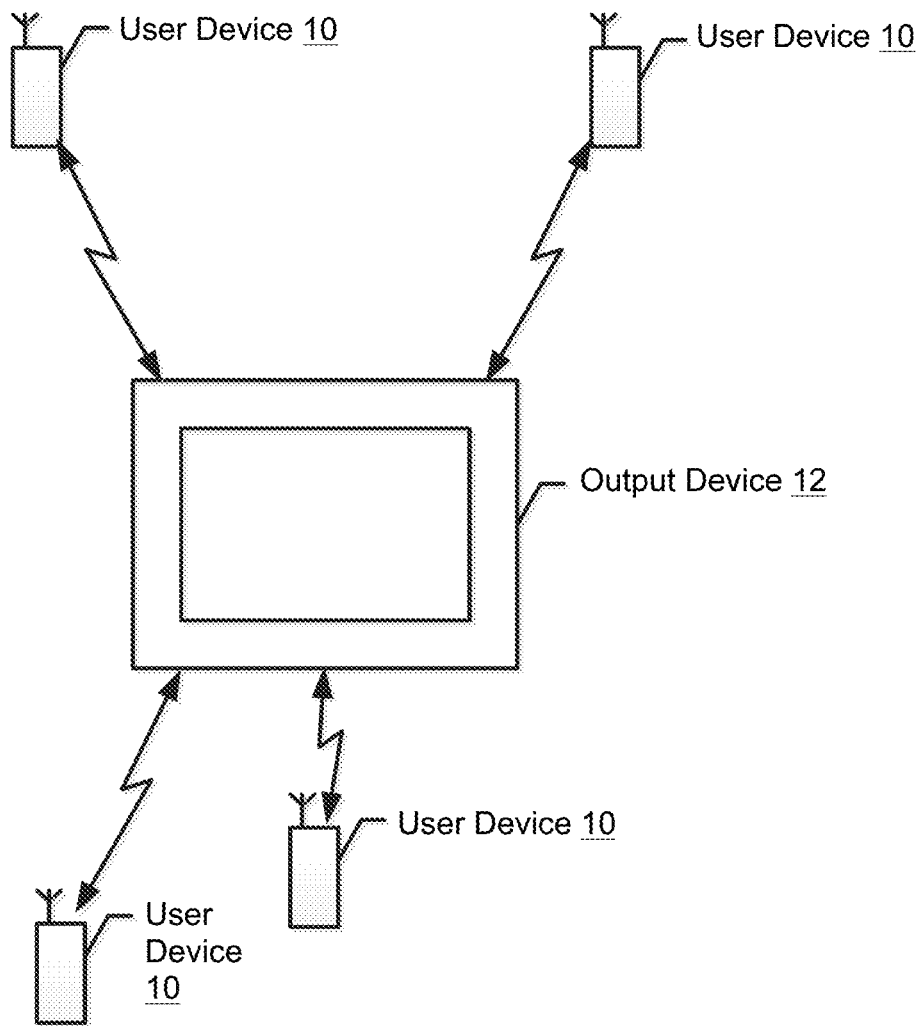
Figure 2:
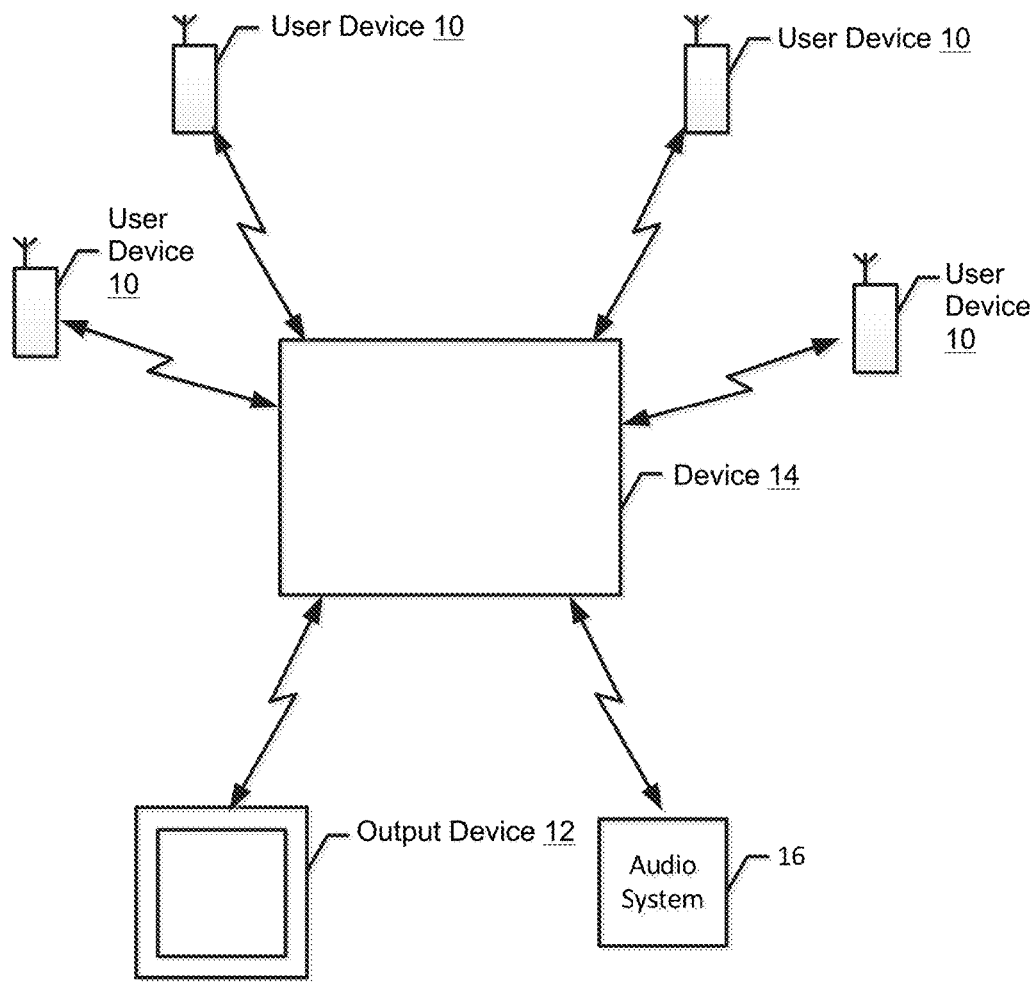
Figure 3:
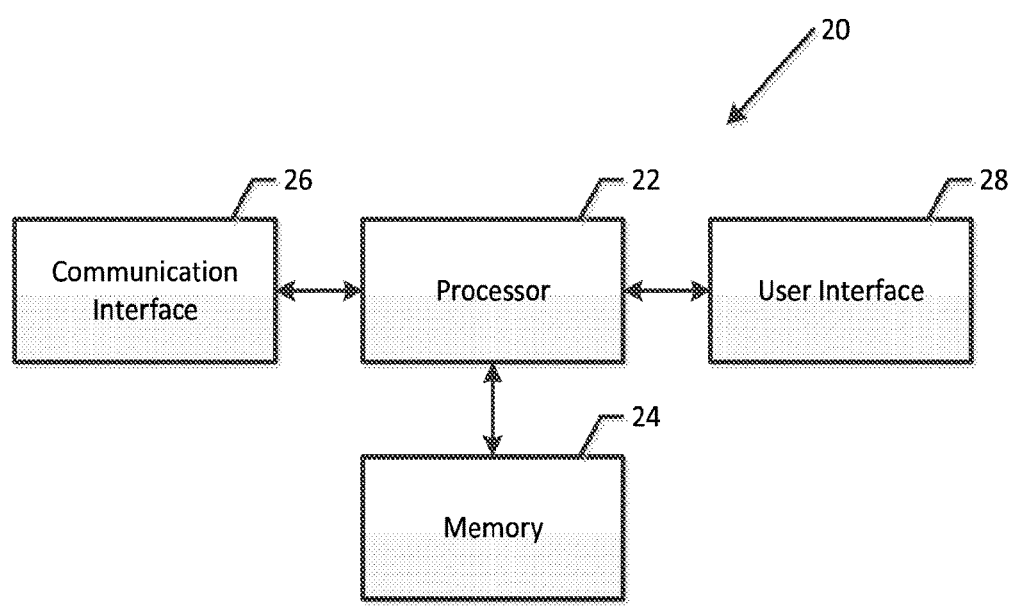
Figure 4:
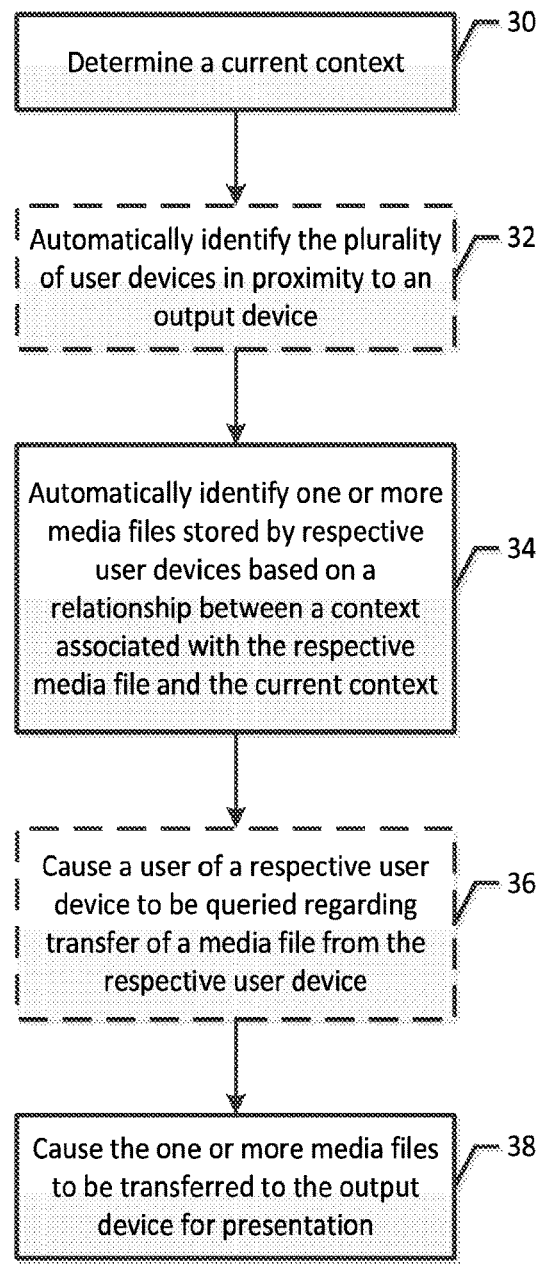

Having thus described example embodiments of the invention in general terms, reference will now be made to the accompanying drawings, which are not necessarily drawn to scale, and wherein:

FIG. 1 is a schematic representation of a plurality of user devices in communication with an output device for automatically identifying one or more media files for transfer to the output device for presentation in accordance with an example embodiment of the present invention;

FIG. 2 is a schematic representation of a plurality of user devices in communication with another device, such as a server, for automatically identifying one or more media files for transfer to an output device for presentation in accordance with another example embodiment of the present invention;

FIG. 3 is a block diagram of an apparatus that may be specifically configured in order to automatically identify one or more media files for transfer to an output device for presentation in accordance with an example embodiment of the present invention; and FIG. 4 is a flow chart illustrating the operations performed, such as by the apparatus of FIG. 3, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to identify media files stored by user devices 10 based upon a relationship between context associated with a respective media file and the current context. A method, apparatus and computer program product may identify various types of media files, such as songs, videos, images or the like. Regardless of the type of media file, the storage of a media file by a respective user device may include both the physical storage of the media file itself, such as a song, video, image or the like, within the local memory of the respective user device as well as storage of an identifier or other reference to the media file, such as a link, a pointer or the like, with the media file itself being stored remotely from the respective user device, such as within cloud storage, by a server or the like. As such, storage of a media file by a respective user device refers to the storage of at least an indication or reference to the media file including, in some embodiments, storage of the media file itself.

The media files that are stored by respective user devices 10 and then transferred to an output device 12 for presentation may occur in various settings. For example, FIG. 1 depicts a configuration in which a plurality of user devices that store one or more media files are in proximity to an output device. For example, the user devices may be considered to be proximate the output device in an instance in which the user devices and output device may communicate via a short range wireless communication technique, such as via Bluetooth, e.g., Bluetooth Low Energy, or Zigbee, communication techniques or via a wireless local area network.

The media files may be stored by a wide variety of user devices 10 including a mobile terminal including, for example, a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. The user devices may additionally or alternatively include a fixed or other non-mobile computing device, such as a desktop computer, a personal computer, a workstation or the like. Additionally, a wide variety of output devices 12 may provide for receipt of the media files and presentation of those media files. In one embodiment, one of the user devices may also serve as the output device. Alternatively, the output device may be distinct from the user devices, such as shown in FIG. 1, and, as such, may be embodied by a digital picture frame, a television display, a display of a personal computer, an audio system or any other device for outputting or presenting the media file.

As noted above, the method, apparatus and computer program product of an example embodiment may be deployed in a variety of settings. As shown in FIG. 2, for example, a plurality of user devices 10 may not necessarily communicate directly with the output device 12, but the user devices and the output device may, instead, communicate with another device 14, such as a server or other intermediary network device, that is distinct from both the output device and the plurality of user devices. For example, the intermediary device may be an entertainment hub or console, such as an entertainment/gaming/streaming system, having a microphone for receiving voice input and being configured to interface with user devices. In the embodiment of FIG. 2, the user devices and the output device may be proximate the server or other intermediary device so as to be configured to communicate with the server or other intermediary device via a short range wireless communication technique, such as via Bluetooth, e.g., Bluetooth Low Energy, or Zigbee, communication techniques or via a wireless local area network. In another embodiment, the output device and the intermediary device may be integrated, such as within a "smart" television or the like. As also shown in the configuration of FIG. 2, various output devices may receive and present the media files, such as a digital picture frame (as exemplified by output device 12) for presenting one or more videos or images and/or an audio system 16 for outputting one or more songs.

An apparatus 20 in accordance with an example embodiment to the present invention may be embodied by any of a variety of computing devices, such as a user device 10, the output device 12 or by a server or other intermediary device 14 that is in communication with both the user devices and the output device. Regardless of the computing device that embodies the apparatus, the apparatus, such as that shown in FIG. 3, is specifically configured in accordance with an example embodiment of the present invention to identify media files stored on user devices based upon a relationship between the context associated with the respective media file and the current context. The apparatus may include or otherwise be in communication with a processor 22, a memory device 24, a communication interface 26 and an optional user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include a communication interface 26 that may be any means such as a device or circuitry embodied in either hardware or a combination of hardware and software that is configured to receive and/or transmit data from/to a communications device in communication with the apparatus, such as to facilitate communications with one or more user devices 10, an output device 12 or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 20 may also optionally include a user interface 28, such as in instances in which the apparatus is embodied by a user device 10, that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Referring now to FIG. 4, the operations performed, such as by the apparatus 20 of FIG. 3, to identify media files stored on user devices 10 based upon a relationship between the context associated with the respective media file and the current context in accordance with an example embodiment are illustrated. As shown in block 30 of FIG. 4, the apparatus may include means, such as the processor 22 or the like, for determining the current context. The current context may be determined in various manners. In one example embodiment, the apparatus, such as the processor, may determine the current context by determining a plurality of users of a plurality of user devices in proximity to the output device 12 and/or to the computing device that embodies the apparatus. In this regard, a user device may be considered to be in proximity in an instance in which short range wireless communications may be established with the user device. In this embodiment, by determining the plurality of users of the plurality of user devices that are proximately located, the apparatus, such as the processor, may be configured to identify the users that are present at a particular location.

Additionally or alternatively, the current context may be determined based upon the topic of conversation between a plurality of users of the plurality of user devices 10. In this embodiment, the apparatus 20 may include a speech recognition application stored by the memory 24 and executed by the processor 22. As such, the apparatus, such as the user interface 28, e.g., a microphone, may collect audio signals that may then be analyzed by the speech recognition application in order to identify one or more topics of the users' conversation. For example, in an instance in the users previously traveled together to a vacation destination, the conversation may relate to the prior vacation destination as the users are reminiscing regarding the trip. Additionally or alternatively, the apparatus, such as the processor, may determine the current context in other manners, such as based upon the current location as may be determined, for example, by a GPS system, based upon the current weather condition as may be determined by reference to a weather application or website, or the like.

As shown in block 34 of FIG. 4, the apparatus 20 may include means, such as the processor 22 or the like, for automatically identifying one or more media files stored by respective ones of the plurality of user devices 10 based upon a relationship between a context associated with the respective media file and the current context. As shown in block 32 of FIG. 4, prior to automatically identifying the media files, the plurality of user devices in proximity to the output device 12 and/or in proximity to the computing device that embodies the apparatus may be determined. As such, the apparatus may also include means, such as the processor, the communication interface 26 or the like, for identifying a plurality of user devices in proximity to the output device and/or in proximity to the computing device that embodies the apparatus prior to automatically identifying one or more media files. The plurality of user devices may be automatically identified in various manners, such as via various short range wireless communication techniques and/or other presence detection techniques, such as Bluetooth Low Energy communication techniques.

In regards to the automatic identification of one or more media files stored by respective ones of a plurality of user devices 10 based upon the relationship between a context associated with the respective media file and the current context, the apparatus 20, such as the processor 22, the communication interface 26 or the like, may request that the plurality of user devices transfer to the apparatus at least a listing of the plurality of media files stored by the respective user devices as well as information regarding the context associated with the respective media files, such as metadata associated with the media files that defines the context. In one example embodiment, the user devices may transfer the media files themselves along with information, such as metadata, regarding the context of the respective media files. In another embodiment, however, the user devices will transfer indications of the respective media files, such as a listing of media file names, identifiers or the like, along with the associated context information, e.g., metadata.

In this example embodiment, the apparatus 20, such as the processor 22, may then compare the current context with the context associated with the respective media files from the user devices 10 in order to identify one or more media files that have an associated context that matches the current context. In this regard, the context of a media file and the current context may be considered to match in an instance in which the contexts are identical or in which contexts differ by no more than a predefined amount. For example, an instance in which the current context is defined based upon the users of the plurality of user devices in proximity to the output device 12 and/or in proximity to the computing device that embodies the apparatus, media files may be considered to have a context associated with the current context in which the context of a media file identifies two or more of the users of the plurality of user devices to be included within the respective media file, such as within a respective video or image. In another example in which the media files are songs and the context associated with the songs include an identification of the people who were present during prior instances in which a respective song was played, the apparatus, such as the processor, may identify one or more of the songs to have a context that matches the current context in an instance in which the context associated with the songs indicates that two or more of the users of the plurality of user devices were present during a prior playing of the song.

Alternatively, the automatic identification of the one or more media files may rely to a greater extent upon the user devices 10. In this example embodiment, the apparatus 20, such as the processor 22, the communication interface 26 or the like, may provide the current context to the plurality of user devices and request that the user devices identify one or more media files stored on the respective user devices that have a context that matches or otherwise has a predefined relationship to the current context. In this embodiment, the apparatus, such as a processor, the communication interface or the like, may automatically identify the one or more media files by identifying those media files that are indicated by the user devices to have a context bearing a predefined relationship to the current context.

As shown in block 38 of FIG. 4, the apparatus 20 may also include means, such as the processor 22, the communication interface 26 or the like, for causing the one or more media files that have been identified based upon a relationship between the context associated with the respective media file and the current context to be transferred to an output device 12 for presentation. As described in conjunction with FIGS. 1 and 2, the type of output device and the manner in which the media file is presented may depend upon the type of media file. For example, in an instance in which the media files are still images, the output device may be a digital picture frame or other display for visually presenting the still images. Alternatively, in an instance in which the media files are songs, the output device may be an audio system 16 for playing the songs. As the media files to be transferred to the output device for presentation are identified based upon a relationship between the context associated with the respective media files and the current context as opposed to the user device 10 that stores the media file, the apparatus, such as a processor, the communication interface or the like, may cause the plurality of media files to be transferred to the output device from a plurality of user devices, thereby resulting in a richer and more inclusive user experience.

In one example embodiment, the media files may be automatically identified and then automatically transferred to the output device 12 for presentation. In another example embodiment, however, the media files that are automatically identified may only be transferred to an output device for presentation following receipt of permission from the user of the user device 10 that would otherwise provide or supply the media file so as to respect the user's privacy interest in the respective media file. In this embodiment, the apparatus 20 may include means, such as the processor 22, the communication interface 26 or the like, for causing a user of a respective user device to be queried regarding the transfer of a media file from the respective user device prior to causing the media file to be transferred to the output device. In this embodiment, the media file may only be transferred to the output device in an instance in which the user of the user device that would otherwise supply the media file agrees to the transfer. As such, in an instance in which the user of the user device declines to provide permission for the transfer of the media file to the output device, the apparatus, such as the processor, the communications interface or the like, will not cause the media file to be transferred to the output device even though the context associated with the media file otherwise matches the current context.

As noted above, the method, apparatus and computer program product may be employed in a variety of settings. By way of one example, however, a group of users may have traveled together to Yosemite National Park. During the trip to Yosemite National Park, the group of users may have taken a number of photographs and may have played their favorite songs. Thereafter, the group of users or a least a subset of the group of users may gather at the home of one of the users. During this gathering, the users may reminisce about their prior trip to Yosemite National Park. In this example, the apparatus 20, such as the processor 22, may determine the current context based upon the users who are present at the home (as determined by the user devices 10 that are automatically identified by presence detection) and by speech recognition techniques that may identify that Yosemite is a topic of conversation. Based upon the current context, the apparatus, such as a processor, the communication interface 26 or the like, may automatically identify one or more media files stored by the user devices and having a context that matches the current context, such as by being associated with two or more of the users who have gathered together and relating to Yosemite, such as defined by metadata associated with the media files. In response to the automatic identification of one or more media files based upon a relationship between the contextual information, one or more media files may be transferred from the user devices to an output device 12 for presentation. For example, one or more photographs of Yosemite National Park may be transferred from the user devices to a digital picture frame for presentation and one or more songs that were played during the trip by the users to Yosemite National Park may be transferred to an audio system 16 for playback. As such, the users may be able to further reminisce regarding the prior trip once exposed to the presentation of the media files.

As the foregoing example demonstrates, the automatic identification of the media files by the method, apparatus and computer program product of an example embodiment allows relevant media files that are stored by one or more user devices to be identified and presented in a very efficient manner without requiring a user to sort through their various media files in a effort to manually identify the relevant media files from among a plurality of media files stored on their respective user device. As such, users may further enjoy their media files without having to invest as much time sorting through the media files to identify media files that would be relevant for the current context.

As described above, FIG. 4 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 32 and 36 in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining a current context by at least identifying a plurality of user devices communicating with an output device using a short range wireless communication technique or a wireless local area network, the current context comprising a first plurality of users associated with the plurality of user devices;
   automatically identifying one or more media files stored at one or more of the plurality of user devices based at least on a relationship between a context associated with the one or more media files and the current context, the context associated with the one or more media files comprising a second plurality of users associated with the one or more media files by at least being present when a content of the one or more media files was generated or previously played, and the one or more media files being identified based at least on the one or more media files being associated with a threshold quantity of the first plurality of users whose user device is communicating with the output device using the short range wireless communication technique or the wireless local area network; and
   transferring, to the output device, the one or more media files for presentation at the output device.

2. The method according to claim 1, further comprising:
   querying a user of the one or more of the plurality of user devices storing the one or more media files prior to transferring the one or more media files to the output device.

3. The method according to claim 1, wherein the one or more media files are transferred from the one or more of the plurality of user devices to the output device.

4. The method according to claim 1, further comprising:
   determining the first plurality of users associated with the plurality of user devices; and
   determining the second plurality of users associated with the one or more media files.

5. The method according to claim 1, wherein the second plurality of users are determined by at least reviewing metadata associated with the one or more media files.

6. An apparatus comprising at least one processor and at least one memory including computer program code, the at least one memory and the computer program code configured to, with the processor, cause the apparatus to at least:
 determine a current context by at least identifying a plurality of user devices communicating with an output device using a short range wireless communication technique or a wireless local area network, the current context comprising a first plurality of users associated with the plurality of user devices;
 automatically identify one or more media files stored at one or more of the plurality of user devices based at least on a relationship between a context associated with the one or more media files and the current context, the context associated with the one or more media files comprising a second plurality of users associated with the one or more media files by at least being present when a content of the one or more media files was generated or previously played, and the one or more media files being identified based at least on the one or more media files being associated with a threshold quantity of the first plurality of users whose user device is communicating with the output device using the short range wireless communication technique or the wireless local area network; and
 transfer, to the output device, the one or more media files for presentation at the output device.

7. The apparatus according to claim 6, wherein the at least one memory and the computer program code are further configured to, with the processor, cause the apparatus to at least:
 query a user of the one or more of the plurality of user devices storing the one or more media files prior to transferring the one or more media files to the output device.

8. The apparatus according to claim 6, wherein the one or more media files are transferred from the one or more of the plurality of user devices to the output device.

9. The apparatus according to claim 6, wherein the at least one memory and the computer program code are configured to, with the processor, cause the apparatus to at least:
 determine the first plurality of users associated with the plurality of user devices; and
 determine the second plurality of users associated with the one or more media files.

10. The apparatus according to claim 6, wherein the second plurality of users are determined by at least reviewing metadata associated with the one or more media files.

11. The apparatus according to claim 6, wherein the apparatus comprises the output device.

12. The apparatus according to claim 6, wherein the apparatus comprises a different device than the output device and the plurality of user devices.

13. A computer program product comprising at least one non-transitory computer-readable storage medium having computer-executable program code portions stored therein, the computer-executable program code portions comprising program code instructions for:
 determining a current context by at least identifying a plurality of user devices communicating with an output device using a short range wireless communication technique or a wireless local area network, the current context comprising a first plurality of users associated with the plurality of user devices;
 automatically identifying one or more media files stored at one or more of the plurality of user devices based at least on a relationship between a context associated with the one or more media files and the current context, the context associated with the one or more media files comprising a second plurality of users associated with the one or more media files by at least being present when the one or more media files was generated or previously played, and the one or more media files being identified based at least on the one or more media files being associated with a threshold quantity of the first plurality of users whose user device is communicating with the output device using the short range wireless communication technique or the wireless local area network; and
 transferring, to the output device, the one or more media files for presentation at the output device.

14. The computer program product according to claim 13, wherein the computer-executable program code portions further comprise program code instructions for at least:
 querying a user of the one or more of the plurality of user devices storing the one or more media files prior to transferring the one or more media files to the output device.

15. The computer program product according to claim 13, wherein the one or more media files are transferred from the one or more of the plurality of user devices to the output device.

16. The computer program product according to claim 13, wherein the program code instructions for determining the current context comprise program code instructions for at least:
 determining the first plurality of users associated with the plurality of user devices; and
 determining the second plurality of users associated with the one or more media files.

17. The computer program product according to claim 13, wherein the second plurality of users are determined by at least reviewing metadata associated with the one or more media files.

18. The method according to claim 1, wherein the relationship comprises the second plurality of users including the threshold quantity of the first plurality of users.

* * * * *